United States Patent
Hipshier et al.

(10) Patent No.: US 9,573,529 B2
(45) Date of Patent: Feb. 21, 2017

(54) VEHICLE INTERIOR COMPONENT HAVING A SEGMENTED COVER PANEL

(71) Applicant: JOHNSON CONTROLS TECHNOLOGY COMPANY, Holland, MI (US)

(72) Inventors: Jason M. Hipshier, Hudsonville, MI (US); Arne Dassen, Holland, MI (US); Jon W. Bornfleth, Zeeland, MI (US); Tyler Newkirk, Grand Rapids, MI (US); David J. McCarthy, Holland, MI (US)

(*) Notice: Subject to any disclaimer, the term of this patent is extended or adjusted under 35 U.S.C. 154(b) by 0 days.

(21) Appl. No.: 14/760,468

(22) PCT Filed: Jan. 10, 2014

(86) PCT No.: PCT/US2014/011092
§ 371 (c)(1),
(2) Date: Jul. 10, 2015

(87) PCT Pub. No.: WO2014/110404
PCT Pub. Date: Jul. 17, 2014

(65) Prior Publication Data
US 2015/0343956 A1    Dec. 3, 2015

Related U.S. Application Data

(60) Provisional application No. 61/751,615, filed on Jan. 11, 2013.

(51) Int. Cl.
*B60R 7/04* (2006.01)
*B60N 2/46* (2006.01)
(Continued)

(52) U.S. Cl.
CPC . *B60R 7/04* (2013.01); *B60N 2/44* (2013.01); *B60N 2/4686* (2013.01); *B60N 3/101* (2013.01)

(58) Field of Classification Search
CPC .......... B60N 2/4686; B60N 3/101; B60R 7/04
(Continued)

(56) References Cited

U.S. PATENT DOCUMENTS

| 4,256,340 A * | 3/1981 | Dunchock | B60R 7/04 296/37.15 |
| 6,478,204 B2 * | 11/2002 | Lange | B60R 7/04 160/35 |

(Continued)

FOREIGN PATENT DOCUMENTS

| CN | 27215334 Y | 8/2005 |
| DE | 8402098 | 5/1984 |

(Continued)

OTHER PUBLICATIONS

PCT International Search Report and Written Opinion mailed Mar. 28, 2014.

*Primary Examiner* — Jason S Daniels

(57) ABSTRACT

A vehicle interior component includes a storage compartment having an opening configured to facilitate access to an interior of the storage compartment. The vehicle interior component also includes a cover panel having multiple segments coupled to one another by corresponding hinges. The cover panel is configured to transition between a closed position that substantially blocks the opening in the storage compartment and an open position that facilitates access to the interior of the storage compartment via rotation of at least one segment about at least one hinge.

21 Claims, 7 Drawing Sheets

(51) Int. Cl.
*B60N 3/10* (2006.01)
*B60N 2/44* (2006.01)

(58) Field of Classification Search
USPC ........... 296/24.34, 24.4, 37.5, 37.8; 160/136, 160/187, 229.1, 230
See application file for complete search history.

(56) References Cited

U.S. PATENT DOCUMENTS

| | | | |
|---|---|---|---|
| 7,721,926 B2 * | 5/2010 | Thomas | B60R 7/04 220/345.3 |
| 2003/0222475 A1 | 12/2003 | Nakamitsu et al. | |
| 2009/0146444 A1 * | 6/2009 | Ichimaru | B60R 7/04 296/37.8 |

FOREIGN PATENT DOCUMENTS

| | | |
|---|---|---|
| EP | 1350673 | 10/2003 |
| EP | 1690740 | 8/2006 |
| GB | 2463570 | 3/2010 |
| JP | 2004067095 | 3/2004 |
| WO | 2005005203 | 1/2005 |

* cited by examiner

VEHICLE INTERIOR COMPONENT HAVING A SEGMENTED COVER PANEL

CROSS REFERENCE TO RELATED APPLICATIONS

This application is a national stage of PCT Application No. PCT/US2014/011092, entitled "VEHICLE INTERIOR COMPONENT HAVING A SEGMENTED COVER PANEL", filed on Jan. 10, 2014, which claims priority from and the benefit of U.S. Provisional Application Ser. No. 61/751,615, entitled "VEHICLE INTERIOR COMPONENT HAVING A SEGMENTED COVER PANEL", filed Jan. 11, 2013. Each of the foregoing applications is hereby incorporated by reference in its entirety.

BACKGROUND

The invention relates generally to vehicle interior components, and more specifically, to a segmented cover panel configured to selective enclose a storage component within a vehicle interior component.

Vehicle storage compartments may be positioned throughout an interior of a vehicle to store cargo and other small items. For example, a floor console may include a storage compartment suitable for storing beverage containers, portable electronic devices, sunglasses, and/or other items. Other storage compartments may be located within a center console, an overhead console, an armrest, seats, door panels, or other areas of the vehicle interior. Certain storage compartments include a door configured to secure the contents of the compartment and/or to hide the contents from view.

Certain vehicle interior assemblies, such as floor consoles, may include multiple storage compartments, each having a respective door. Because each door may include a hinge assembly, a latch assembly, and/or a biasing mechanism, the cost and/or complexity of the storage compartment may increase proportionally to the number of sealable storage compartments. In addition, because the door may rotate between an open position and a closed position, items may not be placed on top of the storage compartment, thereby limiting storage options within the vehicle interior.

SUMMARY

The present invention relates to a vehicle interior component including a storage compartment having an opening configured to facilitate access to an interior of the storage compartment. The vehicle interior component also includes a cover panel having multiple segments coupled to one another by corresponding hinges. The cover panel is configured to transition between a closed position that substantially blocks the opening in the storage compartment and an open position that facilitates access to the interior of the storage compartment via rotation of at least one segment about at least one hinge.

The present invention also relates to a vehicle interior component including a first storage compartment having a first opening configured to facilitate access to a first interior of the first storage compartment. The vehicle interior component also includes a second storage compartment having a second opening configured to facilitate access to a second interior of the second storage compartment. In addition, the vehicle interior component includes a cover panel having at least two segments coupled to one another by at least one hinge. The cover panel is configured to transition to a closed position that substantially blocks the first and second openings, the cover panel is configured to transition to a first open position that facilitates access to the first interior of the first storage compartment via rotation of at least one segment about the at least one hinge, and the cover panel is configured to transition to a second open position that facilitates access to the first interior of the first storage compartment and to the second interior of the second storage compartment via rotation of the at least two segments relative to the storage compartments.

The present invention further relates to a vehicle interior component including a storage compartment having an opening configured to facilitate access to an interior of the storage compartment. The vehicle interior component also includes a trough positioned above the storage compartment. In addition, the vehicle interior component includes a cover panel having a first segment, a second segment, and a third segment. The segments are coupled to one another by respective hinges, the cover panel is configured to transition to a closed position that substantially blocks the opening in the storage compartment and forms a base of the trough, the cover panel is configured to transition to an intermediate position that divides the trough into a first portion and a second portion via rotation of the first and second segments into a triangular configuration, and the cover panel is configured to transition to an open position that facilitates access to the interior of the storage compartment via rotation of the first, second, and third segments about the respective hinges.

DRAWINGS

DETAILED DESCRIPTION

Figure 1A:
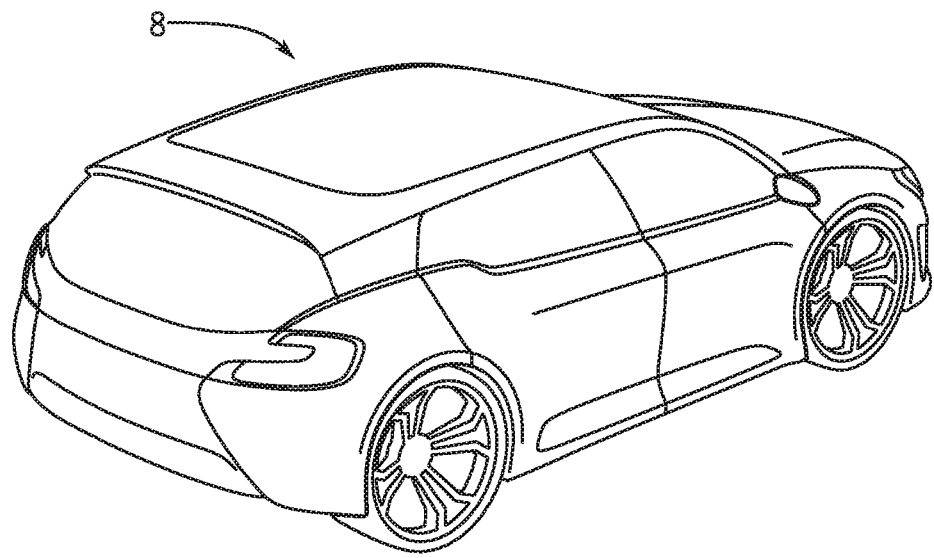
FIG. 1A is a perspective view of an exemplary vehicle that may include a vehicle interior component having a segmented cover panel.
Figure 1B:
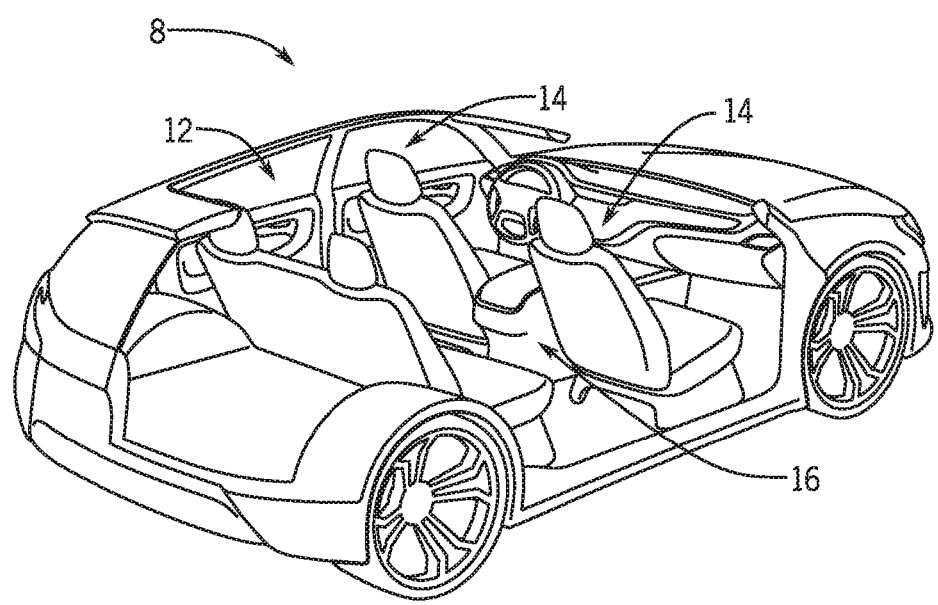
FIG. 1B is a cutaway perspective view of the vehicle of FIG. 1A.

FIG. 1A is a perspective view of an exemplary vehicle 8, and FIG. 1B is a cutaway perspective view of the vehicle 8. The vehicle 8 includes an interior 12 having seats 14 and a floor console 16. As discussed in detail below, the floor console 16 may include a storage compartment having an opening configured to facilitate access to an interior of the storage compartment. The floor console 16 may also include a cover panel having multiple segments coupled to one another by respective hinges. The cover panel is configured to transition to a closed position that substantially blocks the opening in the storage compartment. The cover panel is also configured to transition from the closed position to an open position that facilitates access to the interior of the storage compartment via rotation of at least one segment about at least one hinge.

In certain embodiments, the floor console 16 includes a second storage compartment having a second opening. In such embodiments, the cover panel may be configured to transitioned between the closed position that substantially blocks the openings in the respective storage compartments and a second open position that facilitates access to the respective interiors of the storage compartments by rolling the cover panel into a substantially polygonal configuration. Because each storage compartment may be selectively enclosed by a single cover panel, the cost and/or complexity of the floor console 16 may be substantially reduced, as compared to consoles in which each storage compartment is selectively enclosed by a separate door.

In further embodiments, the floor console 16 includes a trough positioned above the storage compartment. In such embodiments, the cover panel forms a base of the through while in the closed position. The cover panel is also configured to transition to an intermediate position that divides the trough into a first portion and a second portion via rotation of at least two segments into a triangular configuration. As a result, items (e.g., sunglasses, cell phones, keys, wallets, etc.) may be stored and organized within a space above the storage compartment. In addition, the cover panel may transition to the open position by rotating each segment to a substantially vertical orientation adjacent to a wall of the trough. Once in the open position, additional items may be stored in the storage compartment. Because items may be stored within the trough and/or within the storage compartment, the segmented cover panel may provide vehicle occupants with increased storage options.

While the segmented cover panel is described below with reference to a floor console 16, it should be appreciated that the segmented cover panel may be employed to selectively enclose storage compartments throughout the vehicle interior 12. For example, a segmented cover panel may selectively enclose a storage compartment within an overhead console, within a center console, within an instrument panel, within a door panel, and/or within other components of the vehicle interior. Furthermore, it should be appreciated that certain vehicle interior components may include multiple segmented cover panels to selectively enclose respective storage compartments.

Figure 2:
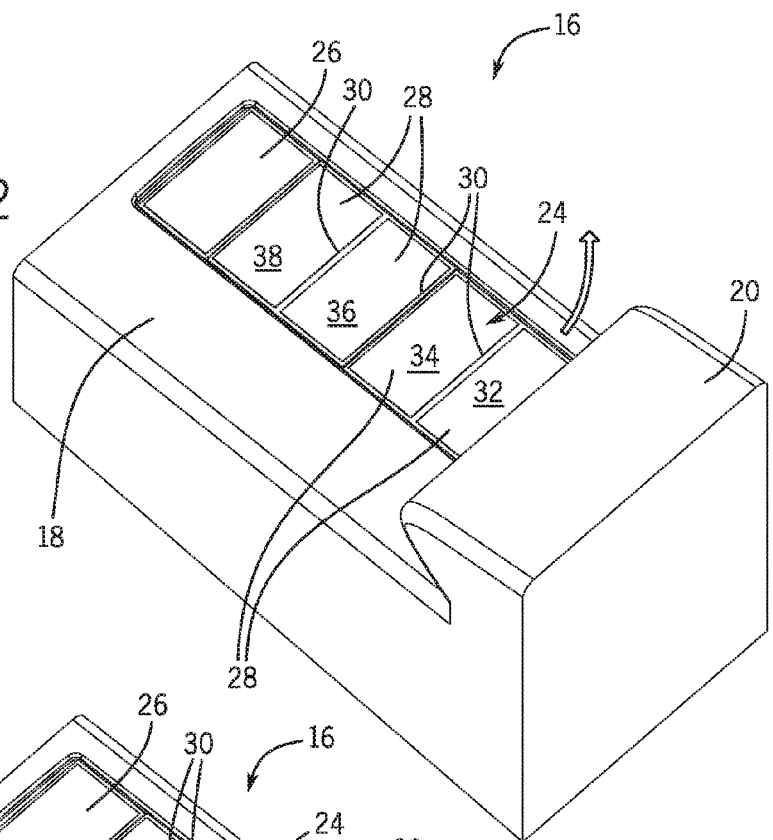
FIG. 2 is a perspective view of an embodiment of a floor console having a segmented cover panel.

FIG. 2 is a perspective view of an embodiment of a floor console having a segmented cover panel. In the illustrated embodiment, a body 18 of the floor console 16 is positioned forward of an armrest 20 relative to a direction of travel of the vehicle 8. The floor console 16 includes a storage compartment and a cover panel 24 positioned above the storage compartment. As illustrated, the cover panel 24 is disposed within a recess 26, thereby establishing a substantially smooth upper surface of the floor console 16 while the cover panel 24 is in a closed position. As discussed in detail below, the storage compartment includes an opening configured to facilitate access to an interior of the storage compartment. In addition, the cover panel 24 includes multiple segments 28 coupled to one another by corresponding hinges 30. While in the illustrated closed position, the cover panel 24 substantially blocks the opening in the storage compartment. However, by rotating at least one segment 28 about at least one hinge 30, the cover panel 24 may be transitioned to an open position that facilitates access to the interior of the storage compartment.

Figure 2A:
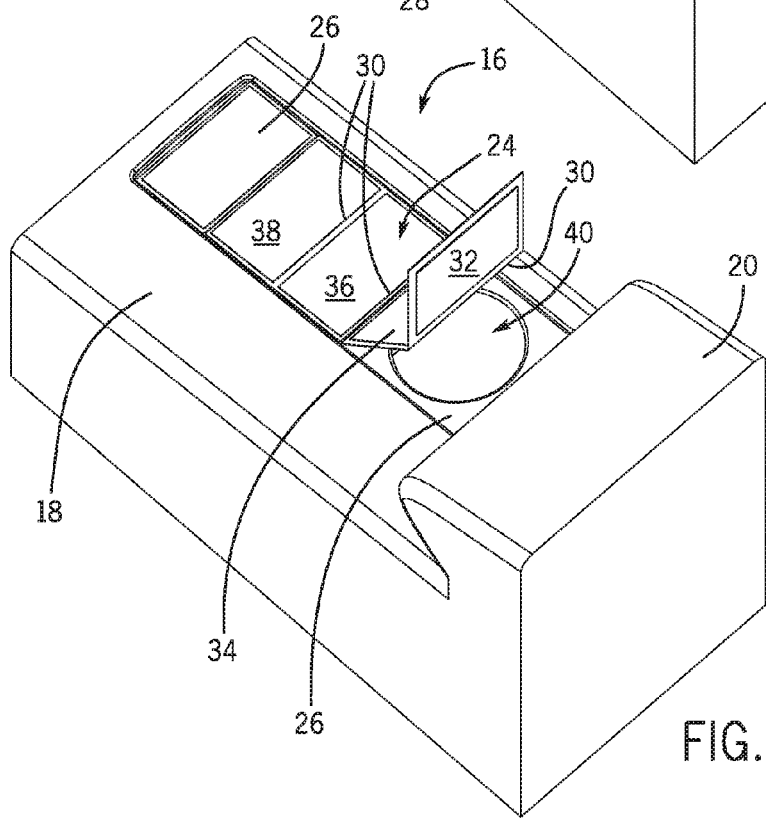
FIG. 2A is a perspective view of the floor console of FIG. 2 with the segmented cover panel in a first partially open position.

In the illustrated embodiment, the cover panel 24 includes a first segment 32 positioned adjacent to the armrest 20 (e.g., while the cover panel 24 is in the closed position), a second segment 34 positioned adjacent to the first segment 32 relative to the direction of travel, a third segment 36 positioned adjacent to the second segment 34 relative to the direction of travel, and a fourth segment 38 positioned adjacent to the third segment 36 relative to the direction of travel. While the illustrated embodiment includes four segments, it should be appreciated that alternative embodiments may include more or fewer segments. For example, certain embodiments may include 2, 3, 4, 5, 6, 7, 8, or more segments. In the illustrated embodiment, the cover panel 24 may be transitioned from the illustrated closed position to an open position by rotating the first and second segments 32 and 34 about a hinge 30 in a direction 39, as shown in FIG. 2A, until the first and second segments 32 and 34 overlap the third and fourth segments 36 and 38. As a result, an opening in a storage compartment positioned beneath the first and second segments 32 and 34 is exposed, thereby facilitating access to the interior of the storage compartment.

Figure 3:
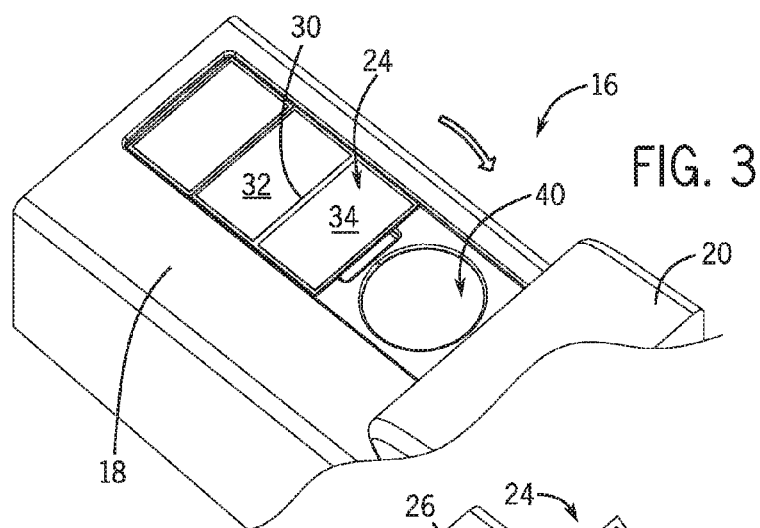
FIG. 3 is a perspective view of the floor console of FIG. 2 with the segmented cover panel in a first open position.

FIG. 3 is a perspective view of the floor console of FIG. 2 with the segmented cover panel 24 in a first open position. As previously discussed, the cover panel 24 is transitioned to the first open position by rotating the first and second segments 32 and 34 about a hinge 30 such that the first and second segments 32 and 34 overlap the third and fourth segments 36 and 38. As a result, an opening in a storage compartment 40 is exposed, thereby facilitating access to the interior of the storage compartment. In the illustrated embodiment, the storage compartment 40 is a cup holder. However, it should be appreciated that other storage compartment configurations may be utilized in alternative embodiments. Furthermore, while the storage compartment 40 is selectively covered by two segments in the illustrated embodiment, it should be appreciated that the storage compartment 40 may be selectively covered by more or fewer segments (e.g., 1, 2, 3, 4, or more) in alternative embodiments. To transition the cover panel 24 to the closed position, the first and second segments 32 and 34 may be rotated about a hinge 30 in a direction 41 until the segments cover the opening in the storage compartment 40.

Figure 4:
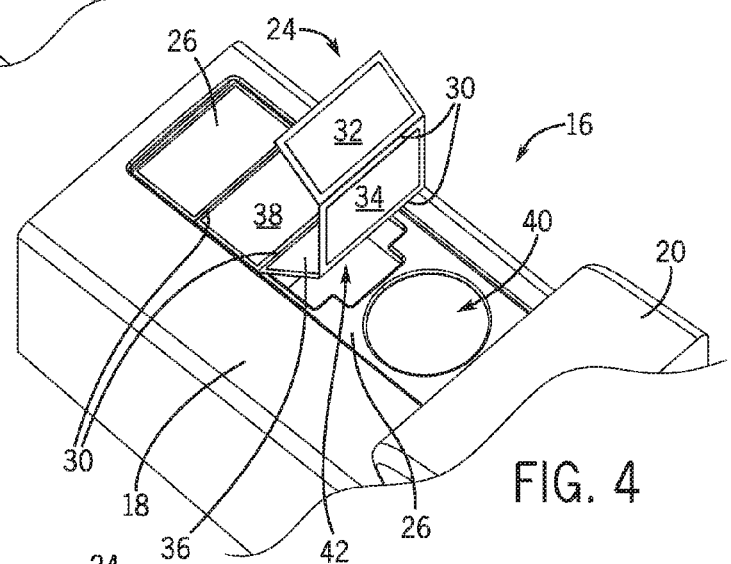
FIG. 4 is a perspective view of the floor console of FIG. 2 with the segmented cover panel in a second partially open position.
Figure 4A:
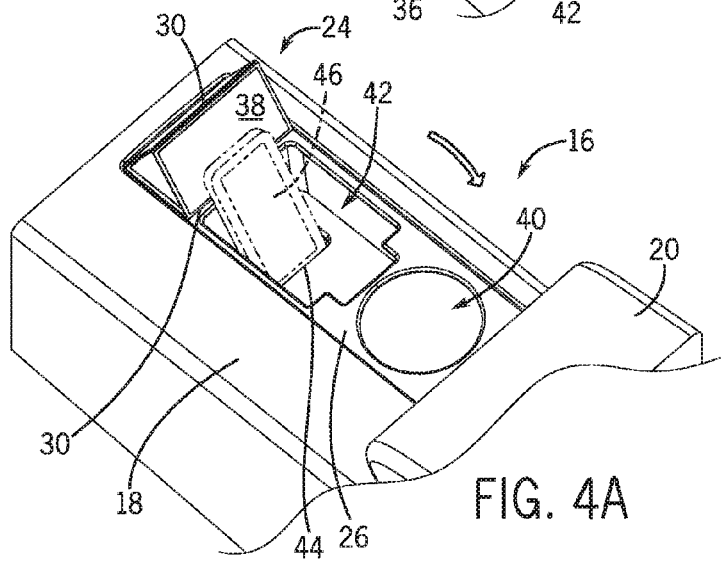
FIG. 4A is a perspective view of the floor console of FIG. 2 with the segmented cover panel in a second open position.

FIG. 4A is a perspective view of the floor console of FIG. 2 with the segmented cover panel 24 in a second open position. To transition the cover panel 24 from the closed position to the illustrated second open position, the cover panel 24 is rolled, as shown in FIG. 4, into a polygonal configuration, such as the illustrated triangular configuration. With the cover panel 24 in the illustrated second open position, an opening in a second storage compartment 42 is exposed, thereby facilitating access to an interior of the second storage compartment 42, as well as the interior of the first storage compartment 40.

In the illustrated embodiment, the second storage compartment 42 includes a recess 44 configured to accommodate a portable electronic device 46, such as a phone, a music player, a tablet, and/or other devices. As illustrated, with the cover panel in the second open position, the third segment 36 is angled to support the portable electronic device 46. For example, the third segment 36 may be angled to direct a screen of the portable electronic device 46 toward a vehicle occupant, thereby enabling the occupant to view the screen. The cover panel 24 may be transitioned to the closed position by unrolling the panel in the direction 41. Because multiple storage compartments may be selectively enclosed by a single panel, the cost and/or complexity of the floor console 16 may be substantially reduced, as compared to configurations in which each storage compartment includes a respective door.

While the cover panel 24 is configured to be rolled into a substantially triangular configuration in the illustrated embodiment, it should be appreciated that alternative cover panels may be configured to roll into other polygonal configurations, such as a rectangular configuration, a pentagonal configuration, or a hexagonal configuration, for example. Furthermore, it should be appreciated that at least a portion of the cover panel 24 may be rotatably coupled to the body 18 of the floor console 16 by a pin or other fastener that enables the cover panel to transition between the closed position, the first open position, and the second open position. Alternatively, the cover panel 24 may be removable from the body 18 of the floor console 16. In certain embodiments, the cover panel may be held in each position via magnets or other coupling devices (e.g., hook-and-loop fasteners, straps, etc.) coupled to the cover panel 24 and/or to the body 18 of the floor console 16. Moreover, the cover panel 24 may include one or more handles or straps that enable a user to grasp the cover panel, thereby facilitating the transition between the closed position, the first open position, and the second open position.

Figure 5:
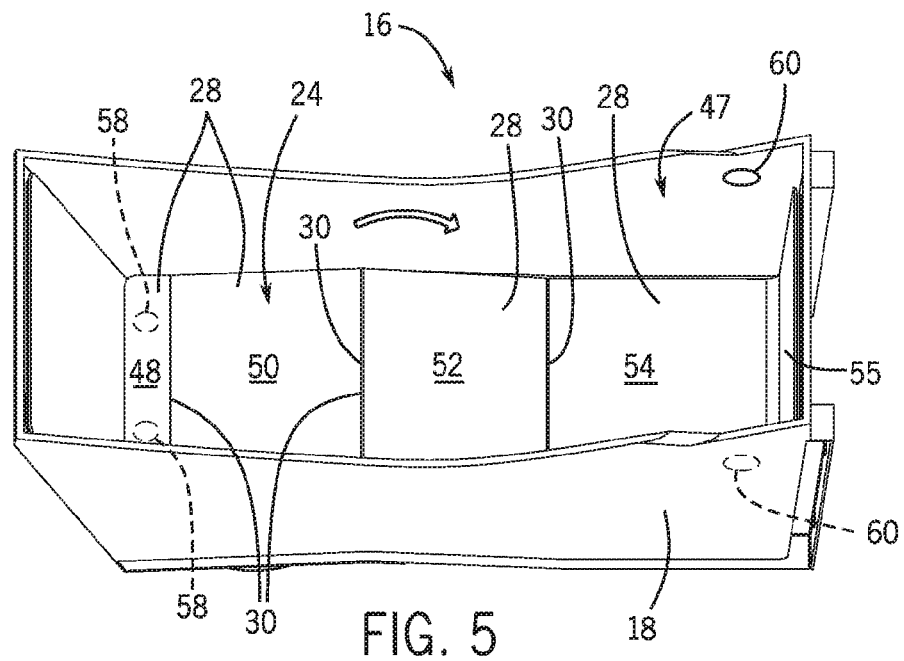
FIG. 5 is a perspective view of another embodiment of a floor console having a segmented cover panel.

FIG. 5 is a perspective view of another embodiment of a floor console having a segmented cover panel. In the illustrated embodiment, the floor console 16 includes a trough 47 positioned above the storage compartment. In addition, the cover panel 24 forms a base of the trough 47 while in the closed position. As illustrated, the cover panel 24 includes a first segment 48, a second segment 50 positioned adjacent to the first segment 48 relative to the direction of travel, a third segment 52 positioned adjacent to the second segment 50 relative to the direction of travel, a fourth segment 54 positioned adjacent to the third segment 52 relative to the direction of travel, and a fifth segment 55 positioned adjacent to the fourth segment 54 relative to the direction of travel. While the illustrated embodiment includes five segments, it should be appreciated that alternative embodiments may include more or fewer segments. For example, certain embodiments may include 2, 3, 4, 5, 6, 7, 8, or more segments. As discussed in detail below, the cover panel 24 is configured to transition to an intermediate position that divides the trough 47 into two portions via rotation of the second and third segments 50 and 52 into a triangular configuration. In addition, the cover panel 24 is configured to transition to an open position that facilitates access to an interior of the storage compartment via rotation of the second, third, and fourth segments 50, 52, and 54 about respective hinges 30 in the direction 56.

In the illustrated embodiment, the cover panel 24 includes magnets 58 configured to hold the cover panel 24 in the closed position, in the intermediate position, and/or in the open position. In addition, the trough 47 includes magnets 60 configured to hold the cover panel in the open position. However, it should be appreciated that the trough 47 may also include magnets configured to hold the cover panel 24 in the closed position and/or in the intermediate position. As will be appreciated, the magnets (e.g., within the cover panel 24 and/or within the trough 47) may interact with other magnets and/or a metallic surface to hold the cover panel in the desired position. In addition, the magnetic attraction may direct the cover panel toward the desired position as the cover panel approaches the desired position.

Figure 5A:
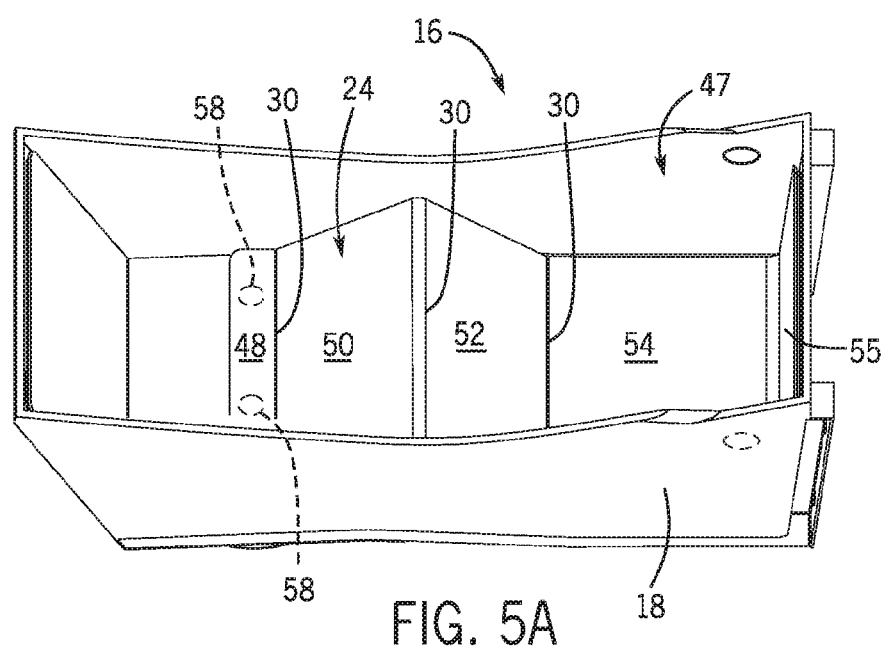
FIG. 5A is a perspective view of the floor console of FIG. 5 with the segmented cover panel between a closed position and an intermediate position.
Figure 6:
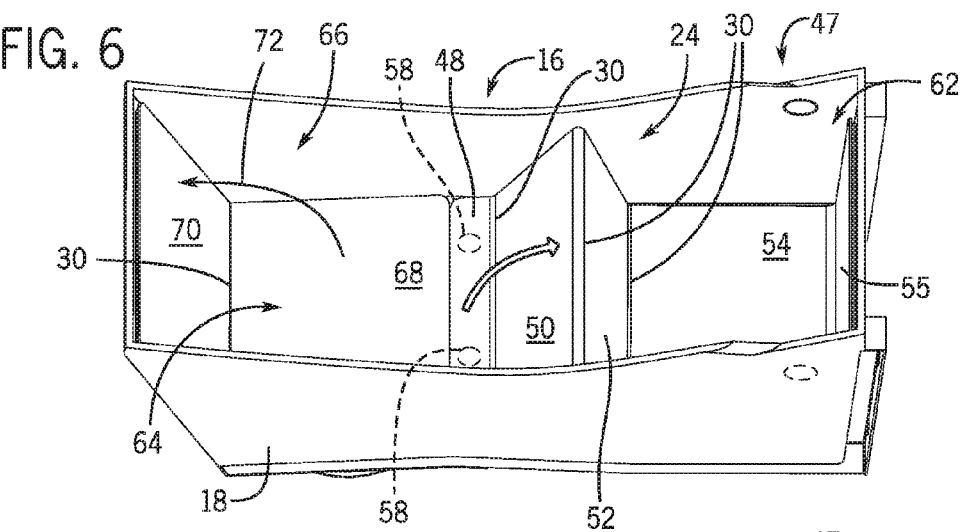
FIG. 6 is a perspective view of the floor console of FIG. 5 with the segmented cover panel in an intermediate position.

FIG. 6 is a perspective view of the floor console of FIG. 5 with the segmented cover panel in an intermediate position. As illustrated, the second and third segments 50 and 52 are rotated, as shown in FIG. 5A, into a triangular configuration, thereby dividing the trough 47 into a first portion 62 and a second portion 64. As a result, items (e.g., sunglasses, portable electronic devices, keys, etc.) may be stored and/or organized within the trough. In certain embodiments, the magnets 58 may be attracted to a metallic surface of, or other magnets within, the floor console body 18, thereby holding the cover panel 24 in the intermediate position.

In addition, the floor console 16 includes a second storage compartment having a second opening configured to facilitate access to a second interior of the second storage compartment. The floor console 16 also includes a second cover panel 66 having two segments 68 and 70 coupled to one another by a hinge 30. The second cover panel 66 is configured to transition between the illustrated closed position that substantially blocks the second opening in the second storage compartment and an open position that facilitates access to the interior of the second storage compartment via rotation of the first segment 68 about the hinge 30 in the direction 72. In certain embodiments, the first cover panel 24 overlaps the second cover panel 66 while the cover panels 24 and 66 are in respective closed positions.

Figure 6A:
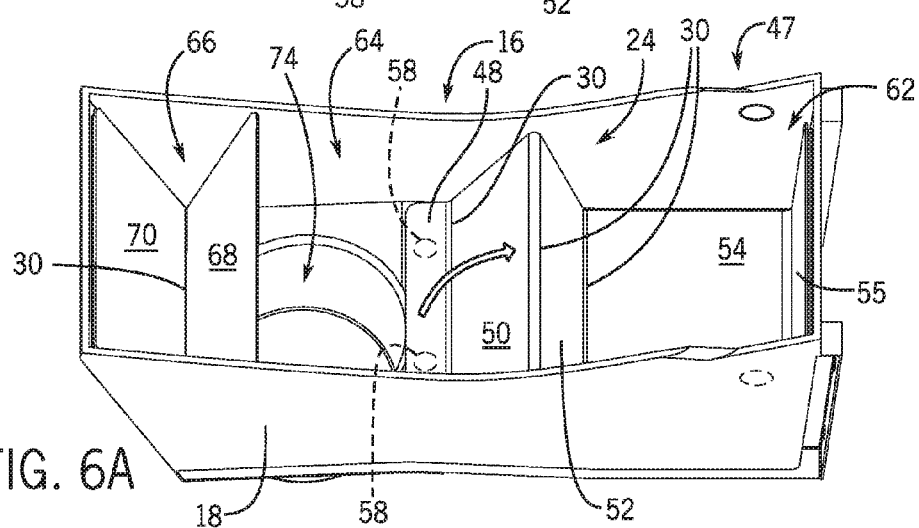
FIG. 6A is a perspective view of the floor console of FIG. 5 with the segmented cover panel in an intermediate position, and a second segmented cover panel in a partially open position.
Figure 7:
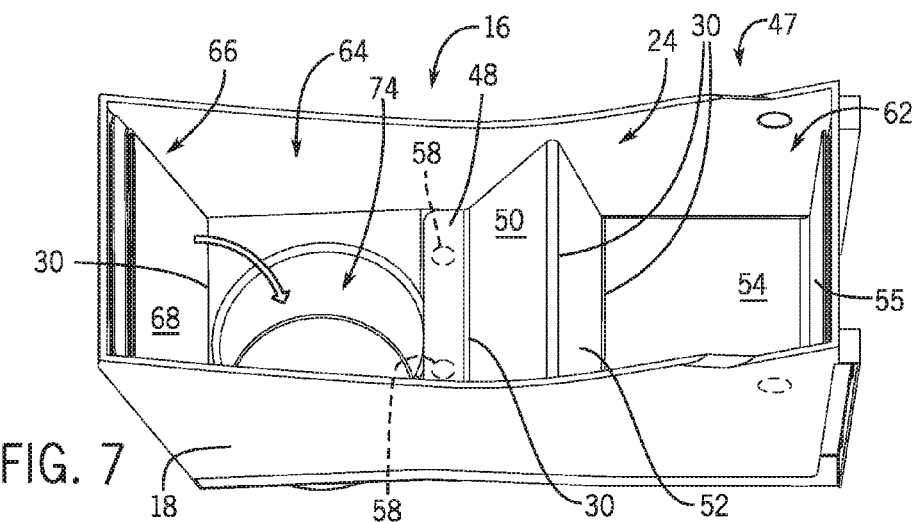
FIG. 7 is a perspective view of the floor console of FIG. 5 with the segmented cover panel an intermediate position, and the second segmented cover panel in an open position.

FIG. 7 is a perspective view of the floor console of FIG. 5 with the segmented cover panel an intermediate position, and the second segmented cover panel in an open position. As illustrated, the first segment 68 of the second cover panel 66 is rotated, as shown in FIG. 6A, such that the first segment 68 is substantially vertical and contacts the second segment 70. With the second cover panel 66 in the open position, a vehicle occupant may access the storage compartment 74 positioned beneath the second cover panel. While the illustrated second storage compartment 74 is a cup holder, it should be appreciated that other storage compartment configurations may be employed in alternative embodiments.

With the second cover panel 66 in the open position, a vehicle occupant may storage a beverage container within the cup holder 74, and may store other items within the first portion 62 of the trough 47. Accordingly, the cover panels 24 and 66 enable the floor console 16 to provide a variety of storage options for the vehicle occupant. For example, the occupant may transition the second cover panel 66 to the closed position by rotating the first segment 68 about the hinge 30 in the direction 75, thereby facilitating storage within the second portion 64 of the trough 47. Similar to the first cover panel 24, the second cover panel 66 and/or the trough 47 may include magnets to hold the cover panel in the open and/or closed positions.

Figure 7A:
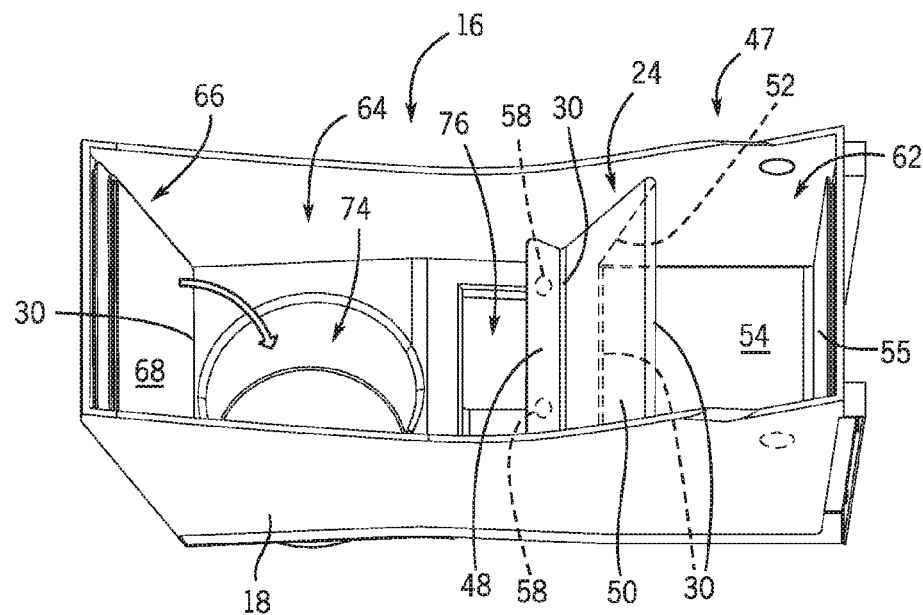
FIG. 7A is a perspective view of the floor console of FIG. 5 with the segmented cover panel in a partially open position.
Figure 8:
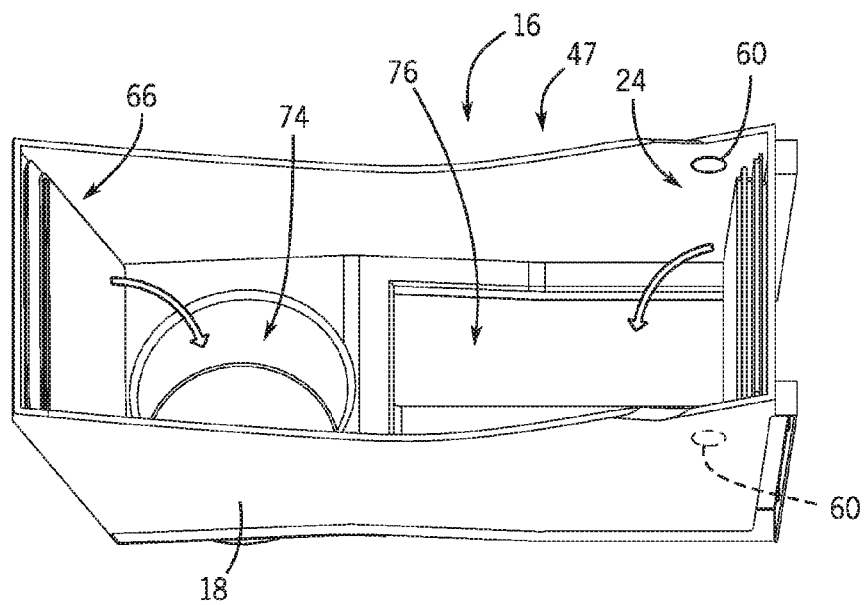
FIG. 8 is a perspective view of the floor console of FIG. 5 with the segmented cover panel in an open position.

FIG. 8 is a perspective view of the floor console of FIG. 5 with the segmented cover panel in an open position. As illustrated, the second, third, and fourth segments of the cover panel 24 are rotated, as shown in FIG. 7A, into a substantially vertical orientation adjacent to a wall of the trough. As a result, a vehicle occupant may access the interior of the storage compartment 76. As previously discussed, magnets 60 within the trough 47 and/or magnets 58 within the cover panel may hold the cover panel in the illustrated open position. The cover panel 24 may be transitioned to the closed position by unfolding the cover panel in the direction 77, thereby blocking access to the storage compartment 76. While the first cover panel is in the open position, as illustrated, or in the intermediate position, the second cover panel 66 may be in either the open position or the closed position depending on whether the occupant desires access to the second storage compartment 74.

In certain embodiments, the first cover panel 24 and/or the second cover panel 66 may include one or more handles or straps to enable an occupant to grasp the respective cover panel, thereby facilitating the transition between positions. In addition, the handle or strap may be inserted within a respective groove or slot of the trough to hold the cover panel in the desired position. Furthermore, while the illustrated embodiment employs magnets to hold each cover panel in a desired position, it should be appreciated that alternative embodiments may utilize other coupling systems, such as hook-and-loop fasteners, adhesives, and so forth.

Figure 9:
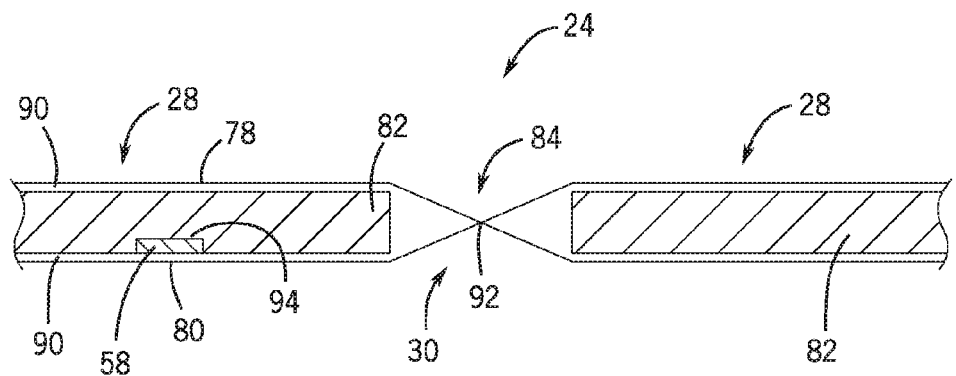
FIG. 9 is a cross-sectional view of an embodiment of a segmented cover panel.
Figure 9A:
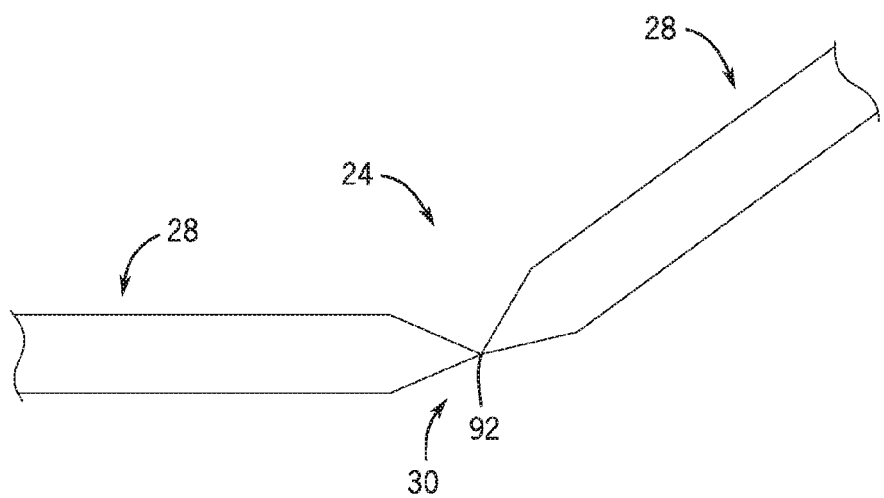
FIG. 9A is a cross-sectional view of the segmented cover panel of FIG. 9 in a bent state.

FIG. 9 is a cross-sectional view of an embodiment of a segmented cover panel 24, and FIG. 9A is a cross-sectional view of the segmented cover panel 24 in a bent state. In the illustrated embodiment, the cover panel 24 includes a first flexible layer 78, a second flexible layer 80, and multiple supports 82 disposed between the first and second flexible layers. Each support 82 is configured to form a corresponding segment 28 of the cover panel 24. In addition, a gap 84 between each pair of adjacent supports 82 is configured to form the hinge 30. Each flexible layer 78 and 80 may be formed from a variety of materials. For example, the first flexible layer 78, which faces the vehicle interior 12 (at least while the cover panel 24 is in the closed position), may be formed from fabric, leather, and/or other materials that establish a show surface having a desirable appearance. Furthermore, the second flexible layer 80, which faces away from the vehicle interior 12 (at least while the cover panel 24 is in the closed position), may be formed from a thermoplastic elastomer, for example. In addition, each support 82 may include a plate formed from metal (e.g., aluminum, steel, etc.) and/or a composite material, such as fiberglass (e.g., FR-4) or carbon fiber.

In certain embodiments, each support 82 is coupled to the first flexible layer 78 and/or to the second flexible layer 80 by an adhesive layer 90. However, it should be appreciated that other bonding methods, such as heat staking and/or thermoforming the flexible sheet to the supports 82, may be employed in alternative embodiments. As illustrated, the first flexible layer 78 is coupled to the second flexible layer 80 at the gap 84. For example, the layers may be coupled to one another by a stitched seam 92 at the gap. Coupling the layers to one another may reduce wrinkling of the flexible layers and/or may direct the cover panel to flex at the hinge. As will be appreciated, a thickness of each flexible layer may be particularly selected to establish a desired flexibility of the cover panel. For example, in certain embodiments, a thickness of each flexible layer may be about 0.25 mm to about 2 mm, about 0.5 mm to about 1 mm, or about 0.5 mm.

As previously discussed, the cover panel 24 may include a magnet 58 to hold the cover panel in a desired position relative to the floor console body 18. In the illustrated embodiment, the magnet 58 is disposed within a recess 94 that faces away from the show surface of the cover panel. The support 82 may include a shielding material that directs the magnetic field of the magnet away from the show surface of the cover panel. Accordingly, if a magnetically sensitive material (e.g., a credit card having a magnetic strip) is placed on the cover panel, the magnetically sensitive material may be shielded from the magnetic field of the magnet 58.

While the illustrated embodiment includes supports disposed between flexible sheets to form the hinges and segments, it should be appreciated that the hinges and segments may be formed by other structures in alternative embodiments. For example, in certain embodiments, the cover panel may include segments formed from flat sheets of material and mechanical hinges that rotatable couple the segments to one another. In such embodiments, the mechanical hinges and the flat sheets may be covered on one or both sides with a flexible material to provide a desirable appearance.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A component for a vehicle interior comprising: a console configured to be installed in the vehicle interior;
   a first storage compartment in the console having a first opening configured to facilitate access to an interior of the storage compartment;
   a second storage compartment in the console having a second opening; and
   a cover panel having a plurality of segments coupled to one another by a corresponding plurality of hinges;
   wherein the cover panel is configured to transition between a closed position that substantially blocks the first opening and the second opening in the storage compartment and a first open position that facilitates access to the interior of the storage compartment via rotation of at least one segment about at least one hinge; and wherein the cover panel is configured to transition between the closed position that substantially blocks the first opening and the second opening and a second open position that facilitates access to respective interiors of the first storage compartment and the second storage compartment by rolling the cover panel into a substantially polygonal configuration.

2. The vehicle interior component of claim 1 wherein the cover panel comprises a first flexible layer, a second flexible layer, and a plurality of supports disposed between the first flexible layer and the second flexible layer, each support is configured to form a corresponding segment of the cover panel, and a gap between each pair of adjacent supports is configured to form the hinge.

3. The vehicle interior component of claim 2 wherein each support comprises a plate formed from metal, a composite material, or a combination thereof.

4. The vehicle interior component of claim 2 wherein each support is coupled to the first flexible layer, to the second flexible layer, or a combination thereof, by an adhesive layer.

5. The vehicle interior component of claim 2 wherein the first flexible layer is coupled to the second flexible layer at each gap.

6. The vehicle interior component of claim 1 wherein the second storage compartment is configured to accommodate a portable electronic device and at least one segment of the cover panel is configured to support the portable electronic device while the cover panel is in the substantially polygonal configuration.

7. A vehicle interior component comprising:
a storage compartment having an opening configured to facilitate access to an interior of the storage compartment;
a trough positioned above the storage compartment; and
a cover panel having a plurality of segments coupled to one another by a corresponding plurality of hinges;
wherein the cover panel is configured to transition between a closed position that substantially blocks the opening in the storage compartment and an open position that facilitates access to the interior of the storage compartment via rotation of at least one segment about at least one hinge;
wherein the cover panel forms a base of the trough while in the closed position, and wherein the cover panel is configured to transition to an intermediate position that divides the trough into a first portion and a second portion via rotation of at least two segments into a triangular configuration.

8. The vehicle interior component of claim 7 wherein the cover panel is configured to transition to the open position by rotating each segment to a substantially vertical orientation adjacent to a wall of the trough.

9. A vehicle interior component comprising:
a first storage compartment having a first opening configured to facilitate access to a first interior of the first storage compartment;
a second storage compartment having a second opening configured to facilitate access to a second interior of the second storage compartment; and
a cover panel having at least three segments each coupled to one another by at least one hinge, wherein the cover panel is configured to transition to a closed position that substantially blocks the first and second openings, the cover panel is configured to transition to a first open position that facilitates access to the first interior of the first storage compartment via rotation of at least one segment about the at least one hinge, and the cover panel is configured to transition to a second open position that facilitates access to the first interior of the first storage compartment and to the second interior of the second storage compartment via rotation of at least two segments relative to the storage compartments;
wherein the cover panel comprises a first flexible layer, a second flexible layer, and at least two supports disposed between the first flexible layer and the second flexible layer, each support is configured to form a corresponding segment of the cover panel, and a gap between a respective pair of adjacent supports is configured to form the at least one hinge; and
wherein adjacent segments of the cover panel can be folded at the hinge against one another to transition position of the cover panel.

10. The vehicle interior component of claim 9 wherein the first flexible layer is coupled to the second flexible layer at the gap.

11. A vehicle interior component comprising:
a storage compartment having an opening configured to facilitate access to an interior of the storage compartment;
a trough positioned above the storage compartment; and
a cover panel having a first segment, a second segment, and a third segment wherein the segments are coupled to one another by respective hinges, the cover panel is configured to transition to a closed position that substantially blocks the opening in the storage compartment and forms a base of the trough, the cover panel is configured to transition to an intermediate position that divides the trough into a first portion and a second portion via rotation of the first segment and second segment into a triangular configuration, and the cover panel is configured to transition to an open position that facilitates access to the interior of the storage compartment via rotation of the first segment, second segment, and third segment about the respective hinges.

12. The vehicle interior component of claim 11 wherein the cover panel is configured to transition to the open position by rotating each segment to a substantially vertical orientation adjacent to a wall of the trough.

13. The vehicle interior component of claim 11 comprising:
a second storage compartment having a second opening configured to facilitate access to a second interior of the second storage compartment; and
a second cover panel having at least two segments coupled to one another by at least one hinge, wherein the second cover panel is configured to transition between a closed position that substantially blocks the second opening in the second storage compartment and an open position that facilitates access to the second interior of the second storage compartment via rotation of at least one segment about the at least one hinge.

14. The vehicle interior component of claim 11 wherein the cover panel, the trough, or a combination thereof, comprises at least one magnet configured to hold the cover panel in the closed position, in the intermediate position, in the open position, or a combination thereof.

15. The vehicle interior component of claim 14 wherein the at least one magnet is disposed within a recess of the cover panel that faces away from a show surface of the cover panel.

16. A vehicle interior component comprising:
a storage compartment having an opening configured to facilitate access to an interior of the storage compartment; and a cover having a plurality of segments and configured to transition between a closed position that substantially blocks the opening in the storage compartment and an open position that facilitates access to the interior of the storage compartment;

wherein the cover is configured to transition between the closed position and the open position by folding at least one segment onto at least one other segment of the plurality of segments.

17. The vehicle interior component of claim 16 wherein the cover is configured to transition between the closed position and the open position via folding of at least one segment such that two segments of the plurality of segments overlap onto two other segments of the cover.

18. The vehicle interior component of claim 16 wherein the cover comprises a first flexible layer, a second flexible layer, and a plurality of supports between the first flexible layer and the second flexible layer; and wherein each support is configured to form a corresponding segment of the cover.

19. The vehicle interior component of claim 18 wherein each support is coupled to at least one of (a) the first flexible layer, (b) the second flexible layer by an adhesive layer.

20. The vehicle interior component of claim 16 wherein the cover is configured to transition between the closed position and the open position by rolling the cover into a substantially polygonal configuration.

21. The vehicle interior component of claim 20 wherein at least one segment of the cover is configured to support a portable electronic device while the cover is in the substantially polygonal configuration.

* * * * *